(12) United States Patent
Tokoro et al.

(10) Patent No.: US 6,818,161 B2
(45) Date of Patent: Nov. 16, 2004

(54) MOLDED BODY OF THERMOPLASTIC RESIN HAVING SOUND ABSORPTION CHARACTERISTICS

(75) Inventors: Hisao Tokoro, Utsunomiya (JP); Hiroshi Yamazaki, Kawasaki (JP); Satoru Shioya, Kawachi-gun (JP); Mitsuru Shinohara, Utsunomiya (JP); Akinobu Hira, Utsunomiya (JP)

(73) Assignee: JSP Corporation, Tokyo (JP)

( * ) Notice: Subject to any disclaimer, the term of this patent is extended or adjusted under 35 U.S.C. 154(b) by 349 days.

(21) Appl. No.: 10/153,910

(22) Filed: May 24, 2002

(65) Prior Publication Data

US 2003/0011091 A1 Jan. 16, 2003

Related U.S. Application Data (63) Continuation of application No. 09/381,172, filed as application No. PCT/JP98/01480 on Mar. 31, 1998, now abandoned.

(30) Foreign Application Priority Data

Apr. 1, 1997 (JP) .............................................. 9-98152
Jan. 26, 1998 (JP) ............................................. 10-27811

(51) Int. Cl.$^7$ ............................................. B29C 44/06
(52) U.S. Cl. ...................... 264/45.4; 264/46.4; 264/126
(58) Field of Search ............................... 264/45.4, 46.4, 264/126

(56) References Cited

U.S. PATENT DOCUMENTS

| 4,379,859 A | 4/1983 | Hirosawa et al. |
| 4,436,840 A | 3/1984 | Akiyama et al. |
| 4,440,703 A | 4/1984 | Akiyama et al. |
| 4,443,393 A | 4/1984 | Akiyama et al. |
| 4,464,484 A | 8/1984 | Yoshimura et al. |
| 4,504,534 A | 3/1985 | Adachi et al. |
| 4,504,601 A | 3/1985 | Kuwabara et al. |
| 4,567,208 A | 1/1986 | Kuwabara et al. |
| 4,568,608 A | 2/1986 | Kuwabara et al. |
| 4,587,270 A | 5/1986 | Kuwabara et al. |
| 4,598,001 A | 7/1986 | Watanabe et al. |
| 4,602,082 A | 7/1986 | Akiyama et al. |
| 4,676,939 A | 6/1987 | Kuwabara |
| 4,692,507 A | 9/1987 | Akiyama et al. |
| 4,695,593 A | 9/1987 | Kuwabara et al. |
| 4,704,239 A | 11/1987 | Yoshimura et al. |
| 4,711,287 A | 12/1987 | Kuwabara et al. |
| 4,716,021 A | 12/1987 | Akiyama et al. |
| 4,749,725 A | 6/1988 | Akiyama et al. |

(List continued on next page.)

FOREIGN PATENT DOCUMENTS

| EP | 0068467 | 1/1983 |
| EP | 0071981 | 2/1983 |
| JP | 7168577 | 7/1995 |

*Primary Examiner*—Allan R. Kuhns
(74) *Attorney, Agent, or Firm*—Sherman & Shalloway (57) ABSTRACT

An expansion-molded article (foamed body) produced by using foamed and expanded beads, and having open voids has sound absorbing qualities, and can be used as a sound absorbing material. A sound absorbing material which is able to attain a high sound absorption coefficient in a wide acoustic frequency range is provided by a molded article produced by using resin particles, having through hole(s) and a porosity of 45 to 80% in a most densely packed state. The void content of the molded article is 10 to 60%, and the bulk density thereof is 0.01 to 0.6 g/cm$^3$. The molded article has not less than 3 continuous center frequency measuring points at which the sound absorption coefficient is at least 70%, and not less than 7 continuous center frequency measuring points at which the sound absorption coefficient is at least 50% in the sound absorption coefficients at the center frequencies of 250, 315, 400, 500, 630, 800, 1000, 1250, 1600, 2000, 2500 and 3150 (Hz) as determined by the measuring method of reverberant absorption coefficient prescribed in JIS A 1409.

14 Claims, 5 Drawing Sheets

U.S. PATENT DOCUMENTS

| | | |
|---|---|---|
| 4,756,948 A | 7/1988 | Kuramochi et al. |
| 4,777,000 A | 10/1988 | Kuwabara et al. |
| RE32,780 E | 11/1988 | Yoshimura et al. |
| 4,822,542 A | 4/1989 | Kuwabara et al. |
| 4,840,973 A | 6/1989 | Kuwabara et al. |
| 4,889,671 A | 12/1989 | Akiyama et al. |
| 4,948,817 A | 8/1990 | Kuwabara et al. |
| 5,053,435 A | 10/1991 | Kuwabara et al. |
| 5,071,883 A | 12/1991 | Kamiyama et al. |
| 5,122,545 A | 6/1992 | Kuwabara et al. |
| 5,130,341 A | 7/1992 | Kuwabara et al. |
| 5,284,431 A | 2/1994 | Kuwabara et al. |
| 5,340,841 A | 8/1994 | Tokoro et al. |
| 5,391,581 A | 2/1995 | Kuwabara et al. |
| 5,459,169 A | 10/1995 | Tokoro et al. |
| 5,474,841 A | 12/1995 | Matsuki et al. |
| 5,569,681 A | 10/1996 | Tokoro et al. |
| 5,622,756 A | 4/1997 | Tokoro et al. |
| 5,651,912 A | 7/1997 | Mitsumoto et al. |
| 5,679,450 A | 10/1997 | Tokoro et al. |
| 5,747,549 A | 5/1998 | Tsurugai et al. |
| 5,928,776 A | 7/1999 | Shioya et al. |
| 5,968,430 A | 10/1999 | Naito et al. |
| 6,033,770 A | 3/2000 | Matsuki et al. |
| 6,034,144 A | 3/2000 | Shioya et al. |
| 6,077,875 A | 6/2000 | Sasaki et al. |

MOLDED BODY OF THERMOPLASTIC RESIN HAVING SOUND ABSORPTION CHARACTERISTICS

CROSS REFERENCE TO RELATED APPLICATION

This application is a continuation of application Ser. No. 09/381,172, filed Sep. 17, 1999, now abandoned which was filed as PCT International Application No. PCT/JP98/01480 on Mar. 31, 1998 which in turn claims priority from Japanese Patent Application 9-98152/1997, filed Apr. 01, 1997, and Japanese Patent Application 10-27811/1998, filed Jan. 26, 1998.

TECHNICAL FIELD

The present invention relates to a molded body (molded article) of a resin, which has open voids and good sound absorbing qualities in a wide frequency range, and possesses sound absorbing qualities useful for floor backing materials, wall backing materials and core materials thereof, automotive interior materials, or the like.

BACKGROUND ART

The conventional sound absorbing material is generally produced by forming an iron plate or the like into a box, providing openings for conducting sound absorption in the front surface thereof and containing glass wool therein. However, a sound absorbing and insulating panel of this kind has such drawbacks that (i) its weight is heavy and hence very difficult to install, (ii) glass wool used as a sound absorbing material has no water resistance, (iii) it is difficult to fabricate it without using other parts and the like, and its installation becomes large-scale, and (iv) reinforcing members as a sound absorbing member, a sound insulating member and a panel are different from one another, and so the cost, weight and production man-hour thereof increase.

Japanese Patent Application Laid-Open Nos. 137063/1995 and 108441/1996 describe the fact that expansion-molded articles with open voids obtained by molding foamed particles of a specific shape have sound absorbing qualities. These publications describe the expansion-molded articles as having excellent sound absorbing qualities, but this only means that the molded articles have excellent sound absorbing qualities in a narrow acoustic frequency range of specific wavelengths. Therefore, the publications have not taken achievement of an excellent sound absorption coefficient in a wide acoustic frequency range into consideration.

It is an object of the present invention to provide a molded article of a thermoplastic resin having excellent sound absorbing qualities in a wide frequency range.

Another object of the present invention is to provide a molded article of a thermoplastic resin, which has open voids and is excellent in air permeability in addition to sound absorbing qualities.

A further object of the present invention is to provide a molded article of a thermoplastic resin, which is excellent not only in sound absorbing qualities, but also in air permeability and heat insulating property.

DISCLOSURE OF THE INVENTION

According to the present invention, there is thus provided a molded article obtained by bonding small resin pieces composed of a thermoplastic resin to one another so as to form open voids. Examples of the form of the small resin pieces include particles, chips, crushed products, etc. In the present invention, one of these or a mixture thereof is used. The void content of the molded article according to the present invention is 10 to 60%, and the bulk density thereof is 0.01 to 0.6 g/cm$^3$.

The small resin pieces in the present invention are preferably of a structure having through hole(s) or non-through hole(s), particularly a structure having through hole(s). However, the present invention is not always limited to those of the structure having such hole(s). The small resin pieces may be in various shapes. However, the small resin pieces are selected so as to give a porosity of 45 to 80% in a most densely packed state. When the small resin pieces are not of the structure having the hole(s), the porosity is defined as a proportion, in terms of percentage, of a volume occupied by the space portion given by spaces among the small resin pieces to the apparent volume of the small resin pieces in a most densely packed state. When the small resin pieces are of the structure having the hole(s) on the other hand, a volume occupied by the spaces of the holes is also calculated as the porosity. Therefore, the porosity of this case is defined as a proportion, in terms of percentage, of a volume occupied by the total space portion of a space portion given by spaces among the small resin pieces and a space portion given by the spaces of the holes in the small resin pieces to the apparent volume of the small resin pieces in a most densely packed state.

In the present invention, the porosity of the small resin pieces is 45 to 80%.

Incidentally, the reason why the void content of the molded article may be lower than the porosity of the small resin pieces in some cases when both of the porosity and the void content are compared with each other is that a part of the small pieces is melted, and the small pieces may be expanded in some cases when the small pieces are bonded to one another to obtain a molded article. The molded article according to the present invention features that it has not less than 3 continuous center frequency measuring points at which the sound absorption coefficient is at least 70%, and not less than 7 continuous center frequency measuring points at which the sound absorption coefficient is at least 50% in the sound absorption coefficients at the center frequencies of 250, 315, 400, 500, 630, 800, 1000, 1250, 1600, 2000, 2500 and 3150 (Hz) as determined by the measuring method of reverberant absorption coefficient prescribed in JIS A 1409.

In the present invention, the small resin pieces are preferably in the form of particles having through-hole(s). In this case, a ratio (L)/(D) of the maximum length (L) of the through hole in a direction along the hole thereof to the maximum diameter (D) of the small piece at the section perpendicular to the direction along the hole is preferably 0.7 to 1.2.

In the present invention, a polyolefin resin is preferred as the thermoplastic resin, and the small resin pieces are preferably formed from an expandable resin. The present invention includes the constitution that a molded article is bonded to a skin material. In general, the molded article and the skin material are bonded to each other by presetting the skin material in a mold, filling a number of the small resin pieces into the mold and heating the small pieces, thereby producing a molded article.

In the present invention, the small resin pieces having a porosity of 45 to 80% formed of a thermoplastic resin are used as a material and bonded to one another so as to form open voids, thereby forming a molded article. The void content of the molded article is 10 to 60%, and the bulk density thereof is 0.01 to 0.6 g/cm³. The molded article according to the present invention becomes excellent in sound absorbing qualities in a wide frequency range making such structural features a premise condition. Its sound absorption coefficient is greatly improved compared with the expansion-molded articles having mere open voids.

As described above, the molded article according to the present invention has excellent sound absorbing qualities, can exhibit a sufficient function even in the form of a simple material in an application field of sound absorption and sound insulation and moreover can be applied to other wide uses such as combinations with other sound absorbing materials. The molded article according to the present invention can be produced by a molding process comprising filling the small resin pieces into a mold and heating them, thereby integrally fusion-bonding the small resin pieces to one another.

BEST MODE FOR CARRYING OUT THE INVENTION

The present invention will hereinafter be described in detail.

The term "small resin pieces" as used in the present invention means small pieces composed of a thermoplastic resin and having an optional form such as particles, chips or a crushed product obtained by crushing molded articles. In the present invention, one of the particles, chips, crushed product and the like may be chosen for use, or a mixture of two or more of these small resin pieces may be used.

The small resin pieces used in the present invention may be either a foamed body or an unfoamed body.

With respect to a case where the small resin pieces are in the form of particles, i.e., resin particles, the present invention will hereinafter be described. However, it goes without saying that the following description applies to cases where the small resin pieces are in the forms of other chips, crushed product and the like than the particles. When the resin particles are unfoamed particles, they are preferably in the form of hollow particles or of a structure having through hole(s). When the resin particles are foamed particles on the other hand, they are preferably of a structure having through hole(s). Specific examples of the structure of the resin particles include a cylinder of L/D<2, a column or cylinder of L/D≧2, a polygonal prism or cylinder of L/D≧2.5, a prism having a cruciform section, etc. Spheres having a through hole may also be applied to the present invention. In order to obtain foamed particles of such a desired form in particular, there may be mentioned (1) a process in which particles of a base resin for foamed particles are provided and then expanded, and (2) a process in which the base resin is extruded and at the same time expanded. In either the foamed particles or the unfoamed particles, the resin particles can be provided in the desired form by selecting the form of a die orifice of an extruder.

The void content of the molded article of the resin particles according to the present invention is 10 to 60%. The void content A (%) of the molded article of the resin particles having open voids is calculated in accordance with the following equation:

$$A(\%)=[(B-C)/B]\times 100$$

wherein B is the apparent volume (cm³) of the molded article of the resin particles, and C is the true volume (cm³) of the molded article of the resin particles. The apparent volume B is a volume calculated out from the outside dimensions of the molded article, and the true volume C is a volume of the molded article found from an increased volume determined by sinking the molded article into a graduated cylinder containing alcohol.

If the void content is lower than 10%, the viscous friction of air becomes hard to occur because such a molded article has an air layer too little to convert sound energy into thermal energy and vibration energy within the molded article, and so the molded article has no air layer sufficient to propagate sound wave through the interior of the molded article. Therefore, the molded article undergoes lowering in sound absorption coefficient. If the void content exceeds 60% on the other hand, sound wave penetrates into the interior of such a molded article without resistance, and so the contact of the sound wave with the wall surfaces of the resin particles becomes hard to occur, whereby the propagation of energy to the resin composition becomes hard to occur to make it difficult to cause the attenuation of the sound energy. The molded article can exhibit a function as a sound absorbing material so far as the void content thereof is within a range of 10 to 60%.

The void content of the molded article having open voids according to the present invention is preferably 25 to 50% in view of sound absorbing qualities and stability to formation of open voids.

The bulk density of the molded article of the resin particles according to the present invention is 0.01 to 0.6 g/cm³. The bulk density is a value determined by dividing the weight M (g) of the molded article of the resin particles by the apparent volume V (cm³) thereof. The apparent volume is a volume calculated out from the outside dimensions of the molded article. If the bulk density is lower than 0.01 g/cm³, the compression characteristics of such a molded article becomes poor, and the molded article tends to become incapable of satisfying the conditions of hole diameter, which will be described subsequently. If the bulk density exceeds 0.6 g/cm³ on the other hand, the weight of such a molded article becomes heavy, and moreover the molded article involves a problem that it is difficult to become a molded article which satisfies the above-described conditions of void content. It is hence not preferable for the molded article to have such a low or high bulk density.

The above-described bulk density is preferably 0.03 to 0.09 g/cm³ from the viewpoints of the provision of a molded article having high compressive strength and light weight, and profitability.

In the present invention, the sound absorption coefficient means the reverberant absorption coefficient prescribed in JIS A 1409 and measured at 250 to 3150 Hz in ⅓-octave band frequencies based on 1000 Hz (incidentally, the measurement is conducted by determining the area of a sample as 9.72 m² of 3.6 m long and 2.7 m broad and arranging it on a floor surface in the center of a reverberation chamber under conditions of room temperature, 25° C. and 70% relative humidity at Tokyo Metropolitan Industrial Technology Research Institute). In the present invention, the molded article has not less than 3 continuous center frequency measuring points at which the sound absorption coefficient is at least 70%, and not less than 7 continuous center frequency measuring points at which the sound absorption coefficient is at least 50%. It is preferred that said at least 3 continuous center frequency measuring points at which the sound absorption coefficient is at least 70% should be included in said at least 7 continuous center frequency measuring points at which the sound absorption coefficient is at least 50%. The measurement of the reverberant absorption coefficient will now be described in detail. In the present invention, the sound absorption coefficient is determined at measuring frequencies of the following center frequencies: 250, 315, 400, 500, 630, 800, 1000, 1250, 1600, 2000, 2500 and 3150 (Hz) by the measuring method of reverberant absorption coefficient prescribed in JIS A 1409. The molded article according to the present invention exhibits a sound absorption coefficient of at least 70% at not less than 3 continuous points (at least 3 continuous points of, for example, 630, 800 and 1000 (Hz) or 315, 400, 500 and 630) in the above-described measuring frequencies (Hz) and a sound absorption coefficient of at least 50% at not less than 7 continuous points in the above-described measuring frequencies (Hz).

Molded articles having a sound absorption coefficient outside the above range according to the present invention can only exhibit an action as a sound absorbing material the sound absorbing region of which is within a specific frequency range, and are hence unfit to use them as sound absorbing materials for an anti-noise policy.

In the present invention, no particular limitation is imposed on the form of the molded article so far as it satisfies the above-described void content, bulk density and sound absorption coefficient. However, the resin particles as a component of the molded article preferably have through hole(s).

In a molded article obtained by using resin particles having no through hole, the weight thereof is liable to be too heavy when the resin particles are unfoamed particles. When the resin particles are foamed particles having no through hole, it is necessary to set molding and heating conditions low in order to control their secondary expandability. When doing so, however, fusion bonding strength among the foamed particles becomes low. Therefore, it is necessary to set the fusion bonding strength among the foamed particles high. When doing so, however, portions to become voids are also filled in by secondary expansion, resulting in a failure to attain a sufficient void content. As described above, the range of the molding conditions under which a good molded article satisfying both void content and fusion bonding strength among foamed particles at the same time can be provided is limited, and so it is difficult to stably provide a molded article having the desired void content. In the form of the above-described resin particles having no through hole, further, the size of voids formed among the particles tends to vary, and it is difficult to uniformly fill them into a mold, and so a filling density varies every time the resin particles are filled. Therefore, it is difficult to control the void content of the resulting molded article. In addition, it is also difficult to make the void content of the molded article uniform to a certain extent at all positions.

As the hole diameter of the through hole in each resin particle is smaller, or the void content of the resulting molded article is higher, the molded article can be provided as a molded article further excellent in sound absorption coefficient even when its thickness is small. As the hole diameter of the through hole in each resin particle is greater, or the void content of the resulting molded article is lower, the molded article cannot be provided as a molded article excellent in sound absorption coefficient unless its thickness is made great.

In the present invention, besides the void content and bulk density of the molded article, the porosity of the resin particles in a most densely packed state also has an important meaning. The porosity D (%) of the resin particles in a most densely packed state is determined in accordance with the following equation:

$$D(\%)=[(E-F)/E]\times 100$$

wherein E is the apparent volume (cm³) of the resin particles, and F is the true volume (cm³) of the resin particles. The apparent volume E is a volume of a certain amount of the resin particles, which is found by reading from a graduated cylinder when placing the resin particles in the most densely packed state in the empty graduated cylinder. The true volume is a volume of a certain amount of the resin particles, which is found from an increased volume determined by sinking the resin particles into a graduated cylinder containing alcohol.

The porosity in the present invention must be 45 to 80%, preferably 50 to 70%. If the porosity is lower than 45%, the intended void content cannot be attained in the resulting molded article. If the porosity exceeds 80% on the other hand, the sound absorption coefficient of the resulting molded article is lowered. It is hence not preferable to use any resin particles having a porosity outside the above range. When the resin particles are too small or great, the requirements of the present invention as to the void content cannot be satisfied. When the size of the resin particles which satisfy the requirements of the present invention as to the void content is expressed in terms of the weight, its average weight amounts to 1 to 8 mg per resin particle.

When the average value of hole diameters of through holes in the resin particles used for forming a molded article is expressed as d, d is preferably 0.5 to 3.0 mm. If d exceeds 3.0 mm, the hole diameter is great, the opening of the hole is wide, and the contact portion of the wall surface sufficient for the material itself to absorb sound energy is small, so that it is difficult to attain an excellent sound absorption coefficient in a wide frequency range when the material is thin-wall. If d is smaller than 0.5 mm on the other hand, the productivity of the resin particles is deteriorated.

Figure 1:
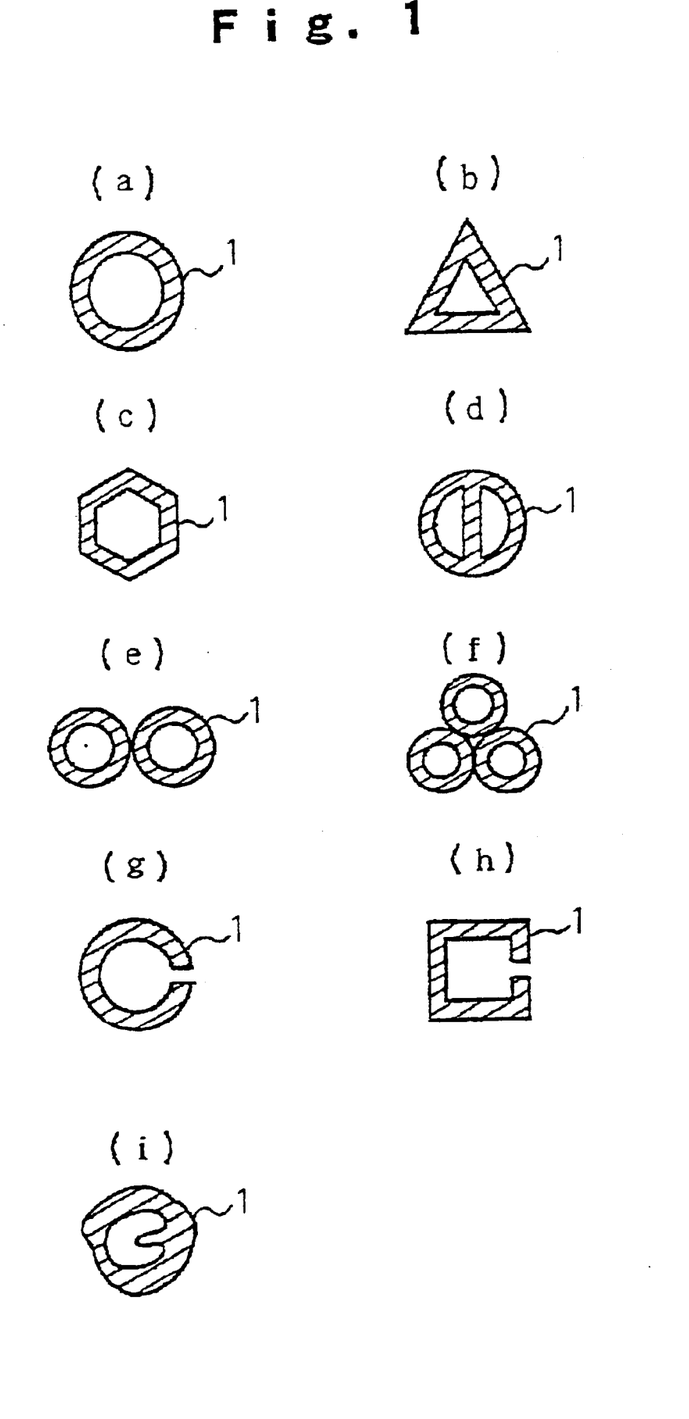
FIG. 1 illustrates embodiments as to vertical sectional forms of resin particles used in the molded articles according to the present invention.

The term "hole diameter" as used in the present invention means the maximum inner diameter of the hole in sections perpendicular to the direction of the hole in the resin particle. FIG. 1 illustrates various forms of resin particle 1 having through hole(s) and shows the sectional forms of the resin particles 1. Examples of the sectional forms thereof include (a) a hollow circle (doughnut form), (b) a hollow triangle, (c) a hollow hexagon, (d) a form that a hollow circle is divided by a partition, (e) a form that 2 hollow circles are arranged side by side, (f) a form that 3 hollow circles are arranged in contact with one another, (g) a hollow circle partially having a discontinuity, (h) a hollow square partially having a discontinuity, and (i) an indeterminate form.

Figure 2:
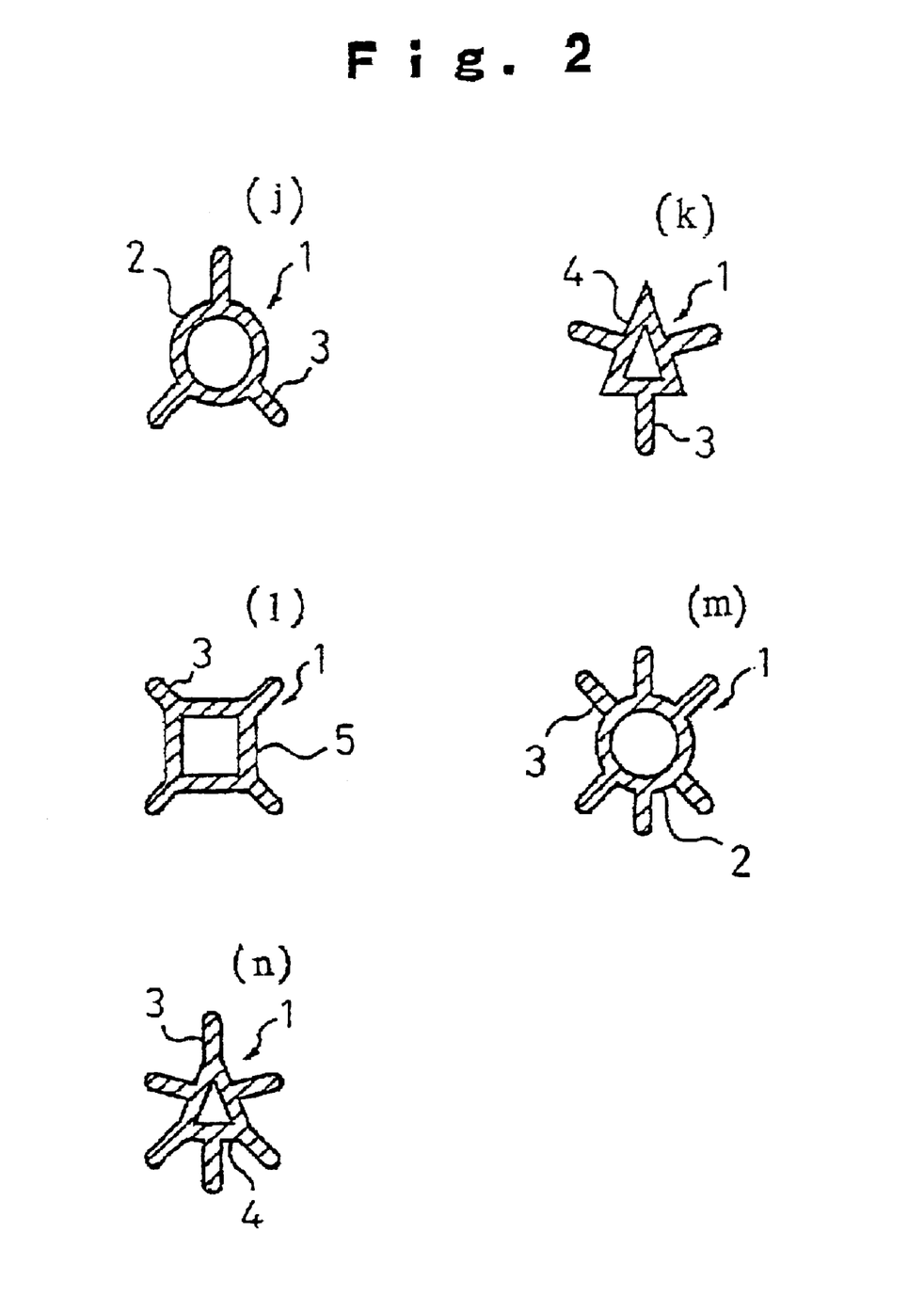
FIG. 2 illustrates other embodiments as to vertical sectional forms of resin particles used in the present invention.

With respect to the form of the resin particles, resin particles in which 3 to 8 branch-like projections are provided on the peripheral surfaces of the resin particles of the above-described structures having through hole(s), i.e., the cylindrical structures are one of the preferred embodiments. Examples of such forms include those always having a fixed form in any section perpendicular to the prescribed direction as illustrated in FIG. 2, said sectional form being (j) a hollow circle 2 having 3 branch-like projections 3 at equally divided positions on the peripheral surface thereof, (k) a hollow triangle 4 having 3 branch-like projections 3 at equally divided positions on the peripheral surface thereof, (1) a hollow square 5 having 4 branch-like projections 3 at equally divided positions on the peripheral surface thereof, (m) a hollow circle 2 having 6 branch-like projections 3 on the peripheral surface thereof, or (n) a hollow triangle 4 having 6 branch-like projections 3 on the peripheral surface thereof.

Figure 3:
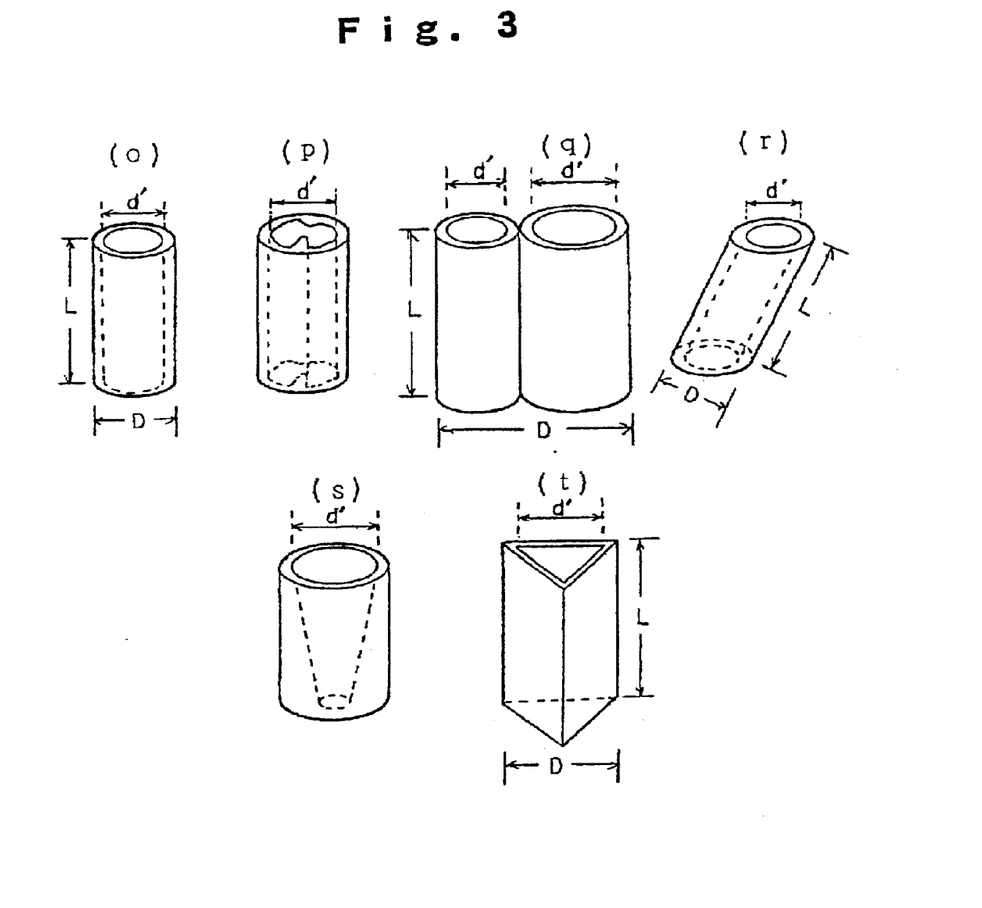
FIG. 3 illustrates specific forms of resin particles used in the present invention.

As embodiments of the above-described resin particles, may be mentioned the forms illustrated in, for example, FIG. 3($o$) to FIG. 3($t$).

More specifically, they are such that as illustrated in FIG. 3($o$) and FIG. 3($t$), any section perpendicular to the direction of the through hole has a substantially fixed structure as illustrated in FIG. 1($a$) and FIG. 1($b$), and the particle is of a straight form; as illustrated in FIG. 3($p$), the section perpendicular to the direction of the through hole exhibits an indeterminate form as illustrated in FIG. 1($i$); as illustrated in FIG. 3($q$), a plurality of such resin particles as shown in FIG. 3($o$) are combined with each other; as illustrated in FIG. 3($r$), the resin particle having a through hole inclines; and as illustrated in FIG. 3($s$), the hole diameter of the through hole in the resin particle varies with the section perpendicular to the direction of the through hole.

A reference character d' indicates a hole diameter of a through hole in a resin particle, and the average value of d' is defined as the average value d of the hole diameters. When a resin particle has at least 2 through holes, d is determined on the basis of the hole diameter d' of each through hole [see FIG. 3($q$)]. When the inner diameter of the through hole varies, the length of the longest part thereof is defined as the hole diameter d' [see FIG. 3($s$)]. In the case of the indeterminate form, the length of the longest line connecting the corresponding points of the through hole without being interrupted by a projection within the through hole is defined as the hole diameter d' of the through hole [see FIG. 3($p$)]. Examples of the measuring points are illustrated in FIG. 3.

When the resin particles are in the form of a cylinder, directional property can be given to the cylindrical resin particles by controlling air pressure upon filling the resin particles into a mold, so that the void content, particularly, the directional property of open voids can be controlled to some extent.

In a resin particle always having a fixed form in any section perpendicular to the prescribed direction, the L/D value thereof is value obtained by dividing the maximum length (L) of the particle in the direction perpendicular to the maximum diameter (D) in the section of the body thereof by the maximum diameter (D). In the case of the resin particles having through hole(s) in particular, the L/D value is a value obtained by dividing the maximum length (L) of the through hole by the maximum diameter (D) in the section perpendicular to (L) (see FIG. 3). In the case where the resin particles are in the form of, for example, a cylinder, L and D correspond to the height and outer diameter of the cylinder, respectively.

In the present invention, the above-described forms of the resin particles are suitably selected, whereby a molded article having various interior void structures can be obtained. Incidentally, all the above-illustrated resin particles always have a fixed form in any section perpendicular to the prescribed direction. However, the resin particles used in the present invention are not limited to these particles. Thus, particles, the sectional form of which is not fixed, may be used. A preferred range of L/D is 0.2 to 7.0.

In the present invention, the L/D of the resin particles having through hole(s) is preferably controlled to 0.7 to 1.2. By controlling the L/D in this manner, the opening area of the resulting molded article, on which sound wave is incident, becomes wide, and the prescribed void content is attained, so that the molded article becomes excellent in sound absorbing qualities.

As means for producing the resin particles, resin particles in the form of a pellet are produced by, for example, a means in which a base resin is melted and kneaded in an extruder, the melt is then extruded into a strand, and the strand is cooled and then chopped into the prescribed lengths, or the strand is chopped into the prescribed lengths and then cooled. In the case where foamed resin particles are provided, there may be used a means in which the above resin particles are dispersed in a dispersion medium in the presence of a foaming agent in a closed vessel to heat the resultant dispersion to a temperature not lower than a temperature at which the resin particles are softened, thereby impregnating the resin particles with the foaming agent, and the vessel is then opened at one end thereof so as to release the resin particles and the dispersion medium at the same time into an atmosphere of a pressure lower than the internal pressure of the vessel (usually, under atmospheric pressure) while maintaining the internal pressure of the vessel higher than the vapor pressure of the foaming agent, thereby expanding the resin particles.

When the foamed particles are provided as described above, there may be used, for example, a process in which particles of a base resin, to which an inorganic substance such as talc, calcium carbonate, borax, aluminum hydroxide or zinc borate has been added, are placed together with a volatile foaming agent and/or an inorganic gas type foaming agent in a closed vessel, the resin particles and foaming agent are dispersed in a dispersion medium in the closed vessel, the resultant dispersion is heated to a temperature not lower than the softening temperature of the resin particles, thereby impregnating the resin particles with the foaming agent, and the vessel is then opened at one end thereof so as to release the resin particles and the dispersion medium at the same time into an atmosphere of a pressure lower than the internal pressure of the vessel, thereby obtaining the foamed particles.

No limitation is imposed on the dispersion medium used in dispersing the resin particles therein so far as it does not dissolve the resin particles. Examples of such a dispersion medium include water, ethylene glycol, glycerol, methanol and ethanol. Water is generally used.

Further, an anti-fusing agent may be used for the prevention of fusion bonding among the resin particles when the resin particles are dispersed in the dispersion medium to heat the resultant dispersion to a foaming temperature. Any anti-fusing agent may be used as such an anti-fusing agent, irrespective of inorganic or organic agent so far as it neither dissolves in water or the like nor melts upon the heating. However, inorganic anti-fusing agents are generally preferred. Preferable examples of the inorganic anti-fusing agents include powders of kaolin, talc, mica, aluminum oxide, titanium oxide, aluminum hydroxide and the like. Besides, an anionic surfactant such as sodium dodecylbenzenesulfonate or sodium oleate may be suitably used as a dispersion aid. The average particle size of the anti-fusing agent is preferably 0.001 to 100 μm, particularly, 0.001 to 30 μm. In general, the amount of the anti-fusing agent to be added is preferably 0.01 to 10 parts by weight per 100 parts by weight of the resin particles. It is also preferable to add the surfactant in a proportion of generally 0.001 to. 5 parts by weight per 100 parts by weight of the resin particles.

Examples of the foaming agent used generally include volatile foaming agents such as propane, butane, hexane, cyclobutane, cyclohexane, trichlorofluoromethane, dichlorodifluoromethane, chlorofluoromethane, trifluoromethane, 1,2,2,2-tetrafluoroethane, 1-chloro-1,1-difluoroethane, 1,1-difluoroethane and 1-chloro-1,2,2,2-tetrafluoroethane, and inorganic gas type foaming agents such as nitrogen, carbon dioxide, argon and air. Of these, inorganic gas type foaming agents which causes no ozonosphere destruction and is cheap are preferred, with nitrogen, air and carbon dioxide being particularly preferred. The amount of the foaming agents other than nitrogen and air to be used is generally 2 to 50 parts by weight per 100 parts by weight of the resin particles. When nitrogen or air is used as the foaming agent, the amount used is such that it is introduced into a closed vessel under a pressure within a pressure range of 5 to 60 kgf/cm$^2$G. The amount of these foaming agents to be used is suitably controlled according to the relationship between the bulk density of the foamed particles to be obtained and a foaming temperature, or between the bulk density and a quantity of heat of fusion of the foamed particles at a high-temperature peak. The quantity of heat of fusion at the high-temperature peak is controlled by a foaming temperature, a heating rate to the foaming temperature, and holding time in the vicinity of the foaming temperature. The quantity of heat of fusion at the high-temperature peak is preferably within a range of 10 to 25 J/g. Incidentally, the quantity of heat of fusion at the high-temperature peak is reflected by the heat history upon the production of the foamed particles and is a quantity of heat corresponding to an area of a portion surrounded by a base line obtained by connecting points corresponding to 80° C. and a melting completion temperature on a DSC curve obtained by differential scanning calorimetry by a straight line, a DSC curve portion indicating a peak on a higher temperature side, and a line drawn down to the base line in such a manner that it passes through a peak of a valley between the peak on the higher temperature side and a peak on a lower temperature side and crosses at right angles with the axis of abscissa on the graph, which indicates temperature.

The resin particles may be colored by adding a color pigment or dye of, for example, a black, gray or brown color to a base resin. When colored foamed particles obtained from the colored base resin are used, a colored molded article of the resin particles can be obtained. The color of the color pigment or dye may be suitably selected from yellow, red, pink, green, blue, etc. in addition to the colors exemplified above according to the use application of the resulting molded article.

When an additive such as the color pigment or dye, or the inorganic substance is added to the base resin, the additive may be directly incorporated into the base resin. In general, it is however preferable to prepare a masterbatch containing the additive in consideration of the dispersibility and the like of the additive and then knead this masterbatch with a base resin. The amount of the color pigment or dye to be added may vary according to the kind and density of a color to be colored. However, it is preferably added in a proportion of generally 0.001 to 5 parts by weight per 100 parts by weight of the base resin. When the resin particles are expanded into foamed particles, the addition of the inorganic substance in the amount described above brings about the effects of enhancing the expansion ratio of the resulting foamed particles and controlling the cell diameter thereof to 50 to 350 μm.

The resin particles for the foamed particles may be obtained, for example, by melting and kneading a masterbatch, to which inorganic substances and the like for addition to the base resin have been added as described above, together with the base resin in an extruder, extruding the melt mixture through a die having the desired sectional form, cooling the extrudate and then cutting it into prescribed lengths. In the case where the base resin particles are obtained in this process, the form of the resin particles is substantially similar to the form of foamed particles obtained by expanding the resin particles at the prescribed expansion ratio. Therefore, the form of the foamed particles is adjusted by adjusting the form of the resin particles.

As another process for obtaining the foamed particles, there may be applied any conventionally known process, for example, a process in which an extruded foam is directly obtained by means of an extruder equipped with a die having the desired sectional form according to a foam extrusion method, and the foam is cut into proper lengths, thereby obtaining foamed particles.

Examples of the thermoplastic resin used in the resin particles in the present invention include polyolefin resins; styrene polymers such as polystyrene, poly(a-methylstyrene), styrene-maleic anhydride copolymers, blends or graft polymers of polyphenylene oxide and polystyrene, acrylonitrile-styrene copolymers, acrylonitrile-butadiene-styrene terpolymers, styrene-butadiene copolymers and high impact polystyrene; vinyl chloride resins such as polyvinyl chloride, vinyl chloride-vinyl acetate copolymers and copolymers of ethylene or propylene and vinyl chloride; polyamide resins; and polyester resins.

Examples of the polyolefin resins include ethylene-butene random copolymers, ethylene-butene block copolymers, polypropylene resins such as ethylene-propylene block copolymers, ethylene-propylene random copolymers, ethylene-propylene-butene random terpolymers and homopolymer of propylene, polyethylene resins such as low density polyethylene, medium density polyethylene, high density polyethylene, linear low density polyethylene, linear very low density polyethylene, ethylene-vinyl acetate copolymers, ethylene-methyl methacrylate copolymers, and ionomer resins obtained by subjecting an ethylene-methacrylic acid copolyiner to intermolecular crosslinking with an metal ion, polybutene-1, polypentene, and ethylene-acrylic acid-maleic anhydride terpolymers.

Although the polyolefin resin may be used without crosslinking it, it may be crosslinked by a peroxide or radiation before use. However, the uncrosslinked resin is preferred from the viewpoints of the number of production processes and recycling ability.

Among the above-mentioned base resins, low density polyethylene, linear low-density polyethylene, polypropylene, ethylene-propylene copolymers, propylene-butene copolymers and ethylene-propylene-butene terpolymers are preferred in that they provide molded articles good in recovery property and toughness.

Of the above-mentioned base resins, ethylene-propylene random copolymers, propylene-butene random copolymers, ethylene-propylene-butene terpolymers are particularly preferred from the viewpoints of heat resistance and strength.

As the polypropylene resins mentioned above as the base resins and having a melting point of 130° C. or higher, such as polypropylene, propylene-ethylene copolymers, propylene-butene copolymers, propylene-ethylene-butene terpolymers, etc. are particularly preferred those obtained by using a metallocene compound as a polymerization catalyst in that they exhibit excellent rigidity and heat resistance compared with those obtained by using another polymerization catalyst in the relations between the melting point and rigidity of the resin and between the melting point and heat resistance of the resin. Incidentally, the metallocene compound is a compound having a structure that, for example, a transition metal is held by unsaturated compound (s) of a π electron system, or a compound in which one or more cyclopentadienyl groups or analogues thereof are present as a ligand on a tetravalent transition metal such as titanium, zirconium, nickel, palladium, hafnium or platinum.

To the base resin, may be added flame retardants of the bromine or phosphorus type, or the like for imparting flame retardancy, antioxidants of the phenol, phosphorus or sulfur type, or the like for preventing deterioration, and light stabilizers of the hindered amine or benzophenone type, or the like, and besides for improving processability, fatty acid metal salts such as calcium stearate as a neutralizer for catalyst and fatty acid amides such as erucic acid amide and oleic acid amide as a lubricant. The above-described additives may preferably be each added in a proportion of 0.001 to 10 parts by weight per 100 parts by weight of the resin.

In the present invention, the various polymers described above may be used either singly or in any. combination thereof as usual. A biodegradable plastic such as polycaprolactone, poly(β-hydroxybutyric acid) or a copolymer thereof, polyvinyl alcohol, or modified starch may also be used in combination with the above-described base resin. When the biodegradable plastic is used in combination with the base resin, both components may be mixed in advance, or particles of both components may be separately expanded to mix the resultant foamed particles with each other. Further, unfoamed resin particles composed of the biodegradable plastic may be mixed with foamed particles composed of the base resin.

In order to impart flexibility to the base resin, a rubber component such as ethylene-propylene rubber may be added in a proportion of 5 to 40 wt. %.

The molded articles according to the present invention can be produced by the following molding process. In the case where the resin particles are, for example, foamed particles, the foamed particles are filled into a mold, and steam is fed to the mold to heat the foamed particles, thereby foaming and expanding them to fusion-bond the foamed particles to one another so as to give an expansion-molded article. When the resin particles are unfoamed particles, they are also filled into a mold like the case where the resin particles are foamed particles, and steam is fed to the mold to heat the resin particles, thereby fusion-bonding the resin particles to one another so as to give a molded article.

When the molded article according to the present invention is formed as an expansion-molded article, a skin may be applied to the expansion-molded article.

As a skin material, there is generally used a synthetic resin sheet. The skin material may be used by forming it into a desired form by injection molding, stamping molding or the like, or by extruding it through a T-die or the like into a sheet in advance and forming the sheet into a desired form by a method such as press molding, air-pressure forming or vacuum forming. The skin material may be used without shaping it in advance by sucking it upon molding of the foamed particles or the like to bring it into close contact with the mold, thereby shaping it. The skin material is preferably composed of a material having fusion bonding property to the foamed particles.

Incidentally, the skin material may be laminated on the molded article with an adhesive or pressure sensitive adhesive.

When the foamed particles are composed of particles of a polyolefin resin, and the base resin of the foamed particles of the polyolefin resin is a polypropylene resin such as a propylene-ethylene random copolymer, as a material of the skin material, there is used a polypropylene resin containing at least 70 wt. % of a propylene component, such as a homopolymer of propylene, ethylene-propylene block copolymer, ethylene-propylene random copolymer, propylene-butene random copolymer or propylene-ethylene-butene random copolymer, or a polyolefin elastomer obtained by containing a rubber component such as ethylene-propylene rubber (EPR) or ethylene-propylene-diene rubber (EPDM) in such a polypropylene resin.

When the base resin of the foamed particles of the polyolefin resin is a polyethylene resin such as linear low density polyethylene, as a material of the skin material, there is used a polyethylene resin such as low density polyethylene, medium density polyethylene, high density polyethylene, linear low density polyethylene, linear very low density polyethylene, and a polyethylene copolymer containing at least 70 wt. % of an ethylene component, or a polyolefin elastomer obtained by containing a rubber component such as EPR or EPDM in such a polyethylene resin.

The skin material is not limited to that of a single-layer structure and may be of a multi-layer structure having a foamed layer or the like. In the case of the skin material of the multi-layer structure, it is necessary to form at least its inner side with a material having fusion bonding property to the foamed particles. As a material of its outer side, there may be used a sheet material having a high decorative effect, such as woven fabric or non-woven fabric.

The thickness of the skin material is preferably 0.3 to 8.0 mm.

In order to produce an expansion-molded article having a skin according to the present invention, a skin material is first fitted to a mold along the inner surface of the mold. After the mold is then clamped in this state, foamed particles are filled into the mold, and steam is fed into the mold to heat the foamed particles, thereby foaming and expanding the foamed particles so as to fusion-bond the foamed particles to one another and moreover to the ski n material. After this manner, an expansion-molded article having a skin with the skin material bonded to the surface of the expansion-molded article can be obtained.

Since the foamed particles having a porosity of at least 45% in the most densely packed state are used in the present invention, steam penetrates between the foamed particles from the foamed particle side (from the side of the surface of the foamed particle layer in no contact with the skin material) near to the skin material even when the skin material has no steam permeability. As a result, the foamed particles in the vicinity of the skin material and the inner side of the skin material are sufficiently heated, so that fusion bonding is certainly achieved among the foamed particles in the vicinity of the skin material and between the foamed particles and the skin material. When the foamed particles having through hole(s) are used in particular, the penetration of steam is further facilitated. The resultant expansion-molded article having a skin has sound absorbing performance equivalent to that having no skin. A skin material having high sound insulating property may be selected for lamination. Incidentally, the measurement of the sound absorption coefficient of the expansion-molded article having a skin is conducted by using a side of the molded article, on which no skin is laminated, as a sound absorbing surface.

The molded articles of the resin particles according to the present invention combine air permeability and heat insulating property in addition to the sound absorbing qualities and can be utilized in a wide variety of fields. For example, they can be used in various use applications such as (1) heat insulating and air-permeable sound absorbing materials in residences, (2) composite materials with building materials in road, aeronautical navigation, rail road, architecture and the like, (3) simplified soundproofing panels for constructional equipment in buildings, and (4) automotive structural materials such as interior materials and bumpers.

The present invention will hereinafter be described in further detail by the following examples and comparative examples.

A base resin composed of an ethylene-propylene random copolymer (ethylene content: 2.4 wt. %, melting point: 146° C., MFR: 10 g/10 min, expressed as EP in Table 1), aluminum hydroxide and carbon black were heated and kneaded in an extruder, and the thus-melted mixture was extruded into a strand through a die. The strand was quenched in water and then chopped into the prescribed lengths, thereby producing 5 kinds of resin particles which were in the sectional form of a hollow cylinder and different from one another in the combination of average hole diameter and average particle weight. With respect to these kinds of resin particles, foamed particles were produced in accordance with the following process. Namely, 60 kg of the resin particles were blended with carbon dioxide as a foaming agent, 400 g of kaolin as a dispersing agent, 6 g of sodium dodecylbenzenesulfonate as a surfactant, and 240 liters of water. While stirring the resultant mixture in a closed vessel (volume: 400 liters), it was heated to 147° C. without raising the temperature of the mixture beyond 161° C. that is a melting completion temperature of the base resin, and held for 15 minutes at the same temperature. The mixture was further heated to 152° C. and held for 15 minutes. A back pressure equal to the equilibrium vapor pressure within the closed vessel was then applied, and the vessel was opened at one end thereof while keeping that pressure to release the resin particles and water at the same time, thereby expanding the resin particles to give gray foamed particles having a sectional form of a hollow cylinder. Incidentally, aluminum hydroxide and carbon black were added by the masterbatching process to give blending amounts of 0.2 wt. % and 0.26 wt. %, respectively.

With respect to the foamed particle samples thus obtained, the average hole diameter d (mm), average particle weight (mg), porosity (%) in a most densely packed state, quantity of heat (J/g) at the high-temperature peak, bulk density (g/cm$^3$) and L/D were determined. The results are shown in Table 1.

The quantity of heat (J/g) at the high-temperature peak shown in Table 1 is a quantity of heat of fusion at a peak on the higher temperature side on a DSC curve obtained by differential scanning calorimetry (heating rate: 10° C./min) of about 2 mg of a foaming particle sample.

The thus-obtained foamed particle samples were each filled into a mold of 1,200 mm×900 mm×50 mm, and heated with steam of 2.8 to 3.8 kgf/cm$^2$G to mold the foamed particles, thereby obtaining expansion-molded articles of the propylene resin in a plank form conforming with the mold dimensions. These molded articles are expressed as I to V in Table 1.

With respect to the molded articles I to V, the bulk density (g/cm$^3$) and void content (%) were determined. The results are shown in Table 1.

With respect to the respective molded articles, a test on sound absorption properties was conducted to determine their sound absorption coefficients.

EXAMPLE 1

The molded article I having a thickness of 50 mm was used as it is to measure its sound absorption coefficient in accordance with the measuring method of reverberant absorption coefficient prescribed in JIS A 1409. The sound absorption coefficient was measured by determining the area of a sample as 9.72 m$^2$ (3.6 m long and 2.7 m broad) and arranging it on a floor surface in the center of a reverberation chamber under conditions of room temperature, 25° C. and 70% relative humidity at Tokyo Metropolitan Industrial Technology Research Institute.

EXAMPLE 2

Two molded articles I were placed on each other to give a thickness of 100 mm, thereby measuring its sound absorption coefficient in the same manner as in Example 1.

EXAMPLE 3

Two molded articles II were placed on each other to give a thickness of 100 mm, thereby measuring its sound absorption coefficient in the same manner as in Example 1.

EXAMPLE 4

Two molded articles III were placed on each other to give a thickness of 100 mm, thereby measuring its sound absorption coefficient in the same manner as in Example 1.

EXAMPLE 5

The molded article IV having a thickness of 50 mm was used as it is to measure its sound absorption coefficient in the same manner as in Example 1.

EXAMPLE 6

The molded article V having a thickness of 50 mm was used as it is to measure its sound absorption coefficient in the same manner as in Example 1.

Comparative Example 1

The molded article II having a thickness of 50 mm was used as it is to measure its sound absorption coefficient in the same manner as in Example 1.

Comparative Example 2

The molded article III having a thickness of 50 mm was used as it is to measure its sound absorption coefficient in the same manner as in Example 1.

Figure 4:
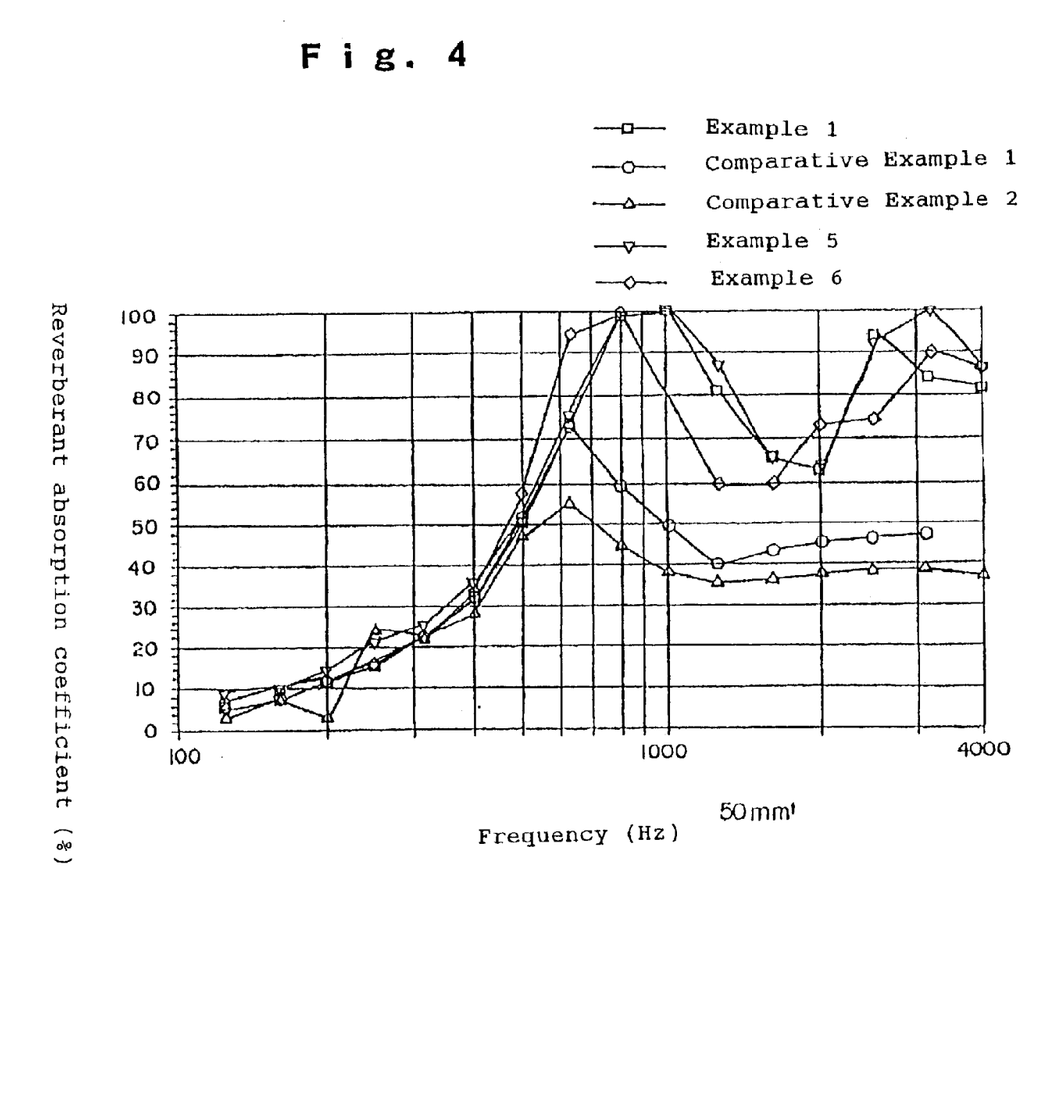
FIG. 4 diagrammatically illustrates the relationships between frequency and sound absorption coefficient in the molded articles of resin particles obtained in Examples 1, 5 and 6 and Comparative Examples 1 and 2.
Figure 5:
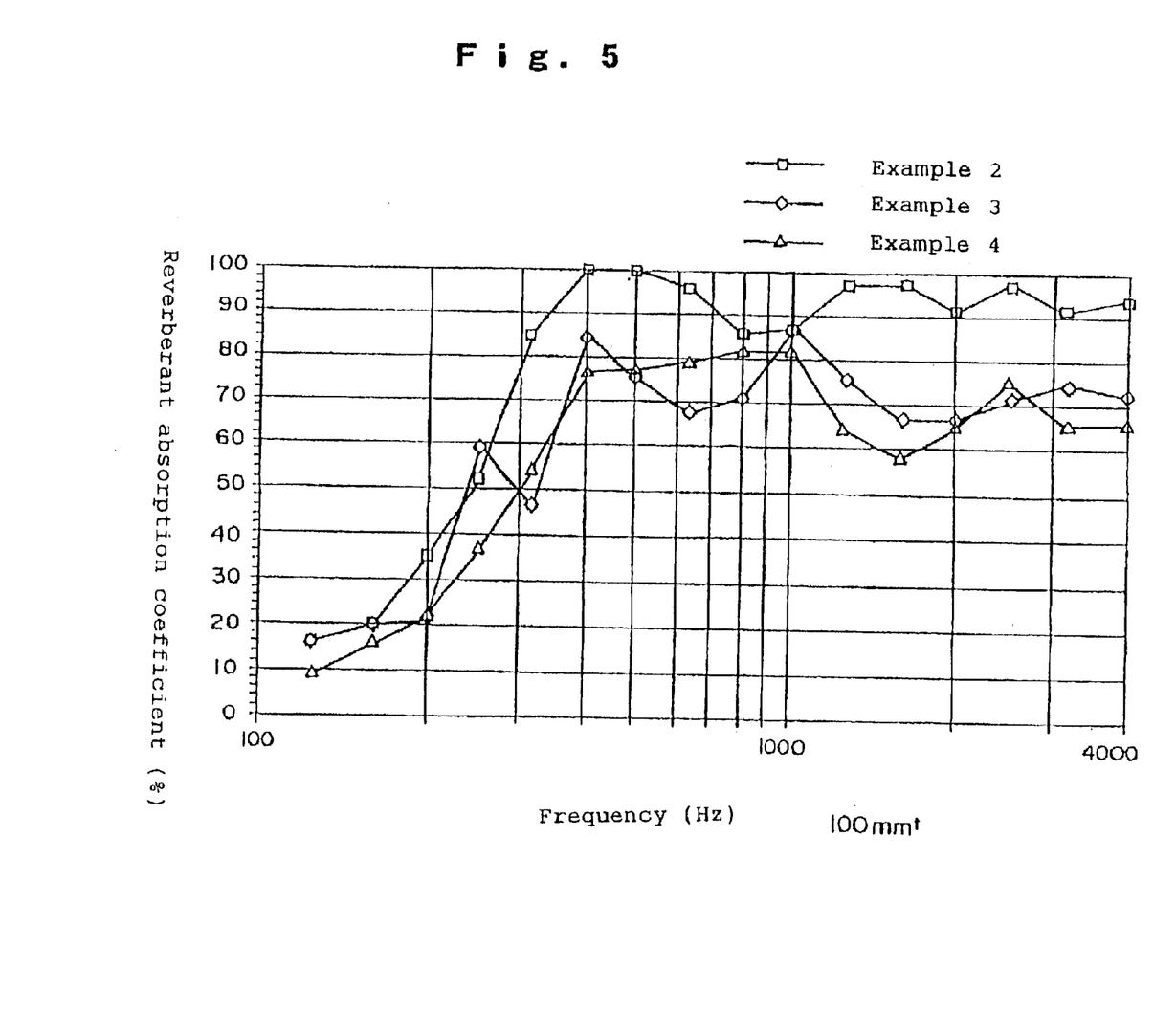
FIG. 5 diagrammatically illustrates the relationships between frequency and sound absorption coefficient in the molded articles of resin particles obtained in Examples 2 to 4.

The measured results of the sound absorption coefficients in Examples 1 to 6 and Comparative Examples 1 and 2 are shown in Tables 2 and 3. The relationships between frequency and sound absorption coefficient in Examples 1 to 6 and Comparative Examples 1 and 2 are diagrammatically illustrated in FIGS. 4 and 5. In these graphs, the axis of abscissa indicates the frequency (Hz) of sound wave, while the axis of ordinate indicates the reverberant absorption coefficient (%).

TABLE 1

| | | Foamed particles | | | | | Expansion-molded article | | |
|---|---|---|---|---|---|---|---|---|---|
| Molded article | Base resin | Sectional form | d (mm) | Average particle weight (mg) | Porosity (%) | Quantity of heat at high-temp. peak (J/g) | Bulk density (g/cm³) | L/D | Bulk density (g/cm³) | Void content (%) |
| I | EP | (a) | 2.3 | 2 | 59 | 17.6 | 0.038 | 0.88 | 0.040 | 30 |
| II | EP | (a) | 4.2 | 6 | 57 | 18.0 | 0.039 | 0.86 | 0.042 | 23 |
| III | EP | (a) | 4.3 | 6 | 56 | 16.5 | 0.037 | 0.80 | 0.040 | 17 |
| IV | EP | (a) | 2.5 | 2 | 60 | 18.8 | 0.039 | 0.98 | 0.041 | 42 |
| V | EP | (f) | 2.3 | 6 | 61 | 18.1 | 0.039 | 0.87 | 0.043 | 36 |

TABLE 2

| | | Molded article | Thickness | Evaluation of sound absorbing qualities |
|---|---|---|---|---|
| Example | 1 | I | 50 | ○ |
| | 2 | I | 100 | ○ |
| | 3 | II | 100 | ○ |
| | 4 | III | 100 | ○ |
| | 5 | IV | 50 | ○ |
| | 6 | V | 50 | ○ |
| Comp. Example | 1 | II | 50 | X |
| | 2 | III | 50 | X |

Evaluation of sound absorbing qualities:
○: Having not less than 3 continuous center frequency measuring points at which the sound absorption coefficient is at least 70%, and not less than 7 continuous center frequency measuring points at which the sound absorption coefficient is at least 50%;
X : Having less than 3 continuous center frequency measuring points at which the sound absorption coefficient is at least 70%, and/or less than 7 continuous center frequency measuring points at which the sound absorption coefficient is at least 50%.

TABLE 3

| Center frequency in ⅓-octave band | Reverberant absorption coefficient (%) | | | | | | | |
|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 |
| 250 | 15 | 52 | 59 | 37 | 21 | 17 | 16 | 24 |
| 315 | 22 | 85 | 46 | 54 | 25 | 22 | 22 | 22 |
| 400 | 32 | 100 | 84 | 76 | 36 | 33 | 31 | 28 |
| 500 | 49 | 100 | 74 | 77 | 52 | 57 | 51 | 47 |
| 630 | 73 | 96 | 67 | 79 | 76 | 94 | 73 | 55 |
| 800 | 99 | 86 | 71 | 82 | 100 | 100 | 59 | 45 |
| 1000 | 100 | 87 | 87 | 82 | 100 | 78 | 49 | 38 |
| 1250 | 81 | 97 | 75 | 64 | 87 | 59 | 39 | 35 |
| 1600 | 65 | 97 | 66 | 58 | 65 | 59 | 43 | 36 |
| 2000 | 62 | 91 | 66 | 65 | 64 | 73 | 45 | 37 |
| 2500 | 94 | 97 | 71 | 75 | 92 | 74 | 46 | 38 |
| 3150 | 84 | 91 | 74 | 65 | 100 | 90 | 47 | 38 |

INDUSTRIAL APPLICABILITY

The molded articles according to the present invention are excellent in sound absorbing qualities in a wide frequency range and also in air permeability and heat insulating property, and are useful as sound absorbing materials incorporated into walls, floors and the like in buildings, sound absorbing materials incorporated into interior materials for vehicles such as automobiles, etc.

What is claimed is:

1. A method for forming a molded article comprising the steps of:
   providing small resin pieces comprising thermoplastic resin and having a porosity of 45 to 80% in a most densely packed state;
   filling a mold with the small resin pieces; and
   heating the small resin pieces in said mold to thereby fuse the small resin pieces to each other and form said molded article, said molded article comprising open voids, a void content of 10 to 60%, and a bulk density of 0.01 to 0.6 g/cm³, and said molded article having not less than 3 continuous center frequency measuring points at which the sound absorption coefficient is at least 70%, and not less than 7 continuous center frequency measuring points at which the sound absorption coefficient is at least 50% in the sound absorption coefficients at the center frequencies of 250, 315, 400, 500, 630, 800, 1000, 1250, 1600, 2000, 2500 and 3150 (Hz), as determined by the measuring method of reverberant absorption coefficient as set forth in JIS A 1409.

2. The method according to claim 1, wherein the small resin pieces are foamed thermoplastic resin particles, whereby the step of heating causes expansion molding of the small foamed thermoplastic resin particles.

3. The method according to claim 1, further comprising providing a skin material which is fusible with the small resin pieces fitting the skin material into the mold; whereby the step of heating the small resin pieces in the mold, results in the pieces being fused to each other and to the skin material.

4. The method according to claim 1, wherein each small resin piece has through hole(s), and has a length L to diameter D ratio (L/D) in the range of from 0.7 to 1.2.

5. The method according to claim 1, wherein the small resin pieces are in the form of at least one of particles, chips or a crushed product.

6. The method according to claim 2, wherein the small resin pieces are foamed particles of polyolefin resin.

7. The method according to claim 6, wherein each foamed particle of polyolefin resin has through hole(s).

8. The method according to claim 6, wherein each foamed particle of polyolefin resin has a cylindrical structure satisfying the relation $L/D \geq 2$, or a polygonal prism structure satisfying the relation $L/D \geq 2.5$, wherein L denotes length and D denotes diameter.

9. The method according to claim 6, wherein each foamed particle of polyolefin resin has branch-like projections on the surface.

10. The method according to claim 3, wherein the skin material has a multi-layered structure, and at least an inner side of this multi-layered skin material comprises a material that fuses with the small resin pieces.

11. The method according to claim 6, wherein each foamed particle has a length L to diameter D ratio (L/D) in the range of from 0.7 to 1.2.

12. A method for manufacturing an expansion-molded article having a skin, wherein the skin material is integrally bonded to surface of the expansion-molded article, comprising the steps of:

fitting the skin material into a mold;

filling small resin pieces of foamed thermoplastic resin into the mold; and heating the small resin pieces with steam to fuse the small resin pieces to one another and to fuse the small resin pieces to the skin material;

wherein the skin material comprises a multi-layered structure having a foamed layer; and wherein each small resin piece has through-hole(s) and the small resin pieces have a porosity of 45 to 80% in their most densely packed state; and wherein said molded article comprises open void content 10 to 60%, and a bulk density of 0.01 to 0.6 $g/cm^3$.

13. The method according to claim 12, wherein the expansion-molded article has a side of the molded article on which no skin is laminated.

14. The method according to claim 12, wherein each small resin piece is a foamed particle of polyolefin resin having through hole(s) and having a length L to diameter D ratio (L/D) in the range of from 0.7 to 1.2.

* * * * *